US006129198A

United States Patent [19]

Nusime

[11] Patent Number: 6,129,198

[45] Date of Patent: Oct. 10, 2000

[54] ESCALATOR OR MOVING WALKWAY

[75] Inventor: Harald Nusime, Laxenburg, Austria

[73] Assignee: Invento AG, Hergiswil, Switzerland

[21] Appl. No.: 09/328,145

[22] Filed: Jun. 8, 1999

[30] Foreign Application Priority Data

Jun. 11, 1998 [EP] European Pat. Off. .............. 98810530

[51] Int. Cl.$^7$ .................................................... B65G 21/00

[52] U.S. Cl. ........................................... 198/326; 198/321

[58] Field of Search .................................... 198/321, 326, 198/327

[56] References Cited

FOREIGN PATENT DOCUMENTS 5-254771 10/1993 Japan .................................... 198/326

OTHER PUBLICATIONS

Patent Abstracts of Japan, Pub. No. 05254771 of Oct. 5, 1993 “Earthquake Resisting Structure In Moving Walkway”.

Patent Abstracts of Japan, Pub. No. 09058956 of Mar. 4, 1997 “Fail Suppressing Device Of Man Conveyor”.

*Primary Examiner*—James R. Bidwell

*Attorney, Agent, or Firm*—Schweitzer Cornman Gross & Bondell LLP

[57] ABSTRACT

An escalator or moving walkway is constructed to absorb oscillation and lateral displacement of a first story relative to a second story between which the escalator or moving walkway extends such as which may occur in the event of an earthquake. End mount devices are provided to serve as fulcrums for the elevator and as dampers. Lateral recesses for the reception of additional damping elements may be provided in recesses formed into the building construction.

5 Claims, 4 Drawing Sheets

ESCALATOR OR MOVING WALKWAY

The invention relates to an escalator or a moving walkway consisting of a carrier, a step belt or plate belt for the transport of persons and objects and a balustrade with handrail, wherein mounts are provided for mounting the carrier, at the building side, at the ends of the escalator.

BACKGROUND OF THE INVENTION

Escalators and moving walkways are usually mounted to the top and bottom on resilient support elements, which each consist of a steel plate and a resilient intermediate layer acting in vertical direction.

It is disadvantageous in the case of this support that in the event of transverse forces the mounting of the escalator or moving walkway is not guaranteed.

It is accordingly a purpose of the present invention to avoid the disadvantages of the known equipment and create a mount by means of which is safety is guaranteed in the case of catastrophe.

It is a further purpose of the present invention that, in the case of the action of forces due to a catastrophe, for example in the event of an earthquake, to provide that the escalator or moving walkway remains in the mounting region. Damage to the building structure and/or to the escalator or moving walkway is thereby prevented.

BRIEF DESCRIPTION OF THE DRAWINGS

The present invention is explained in more detail in the following description of a preferred but nonetheless illustrative embodiment when received with reference to the annexed drawings illustrating the embodiment, wherein.

BRIEF DESCRIPTION OF THE INVENTION

Figure 1:
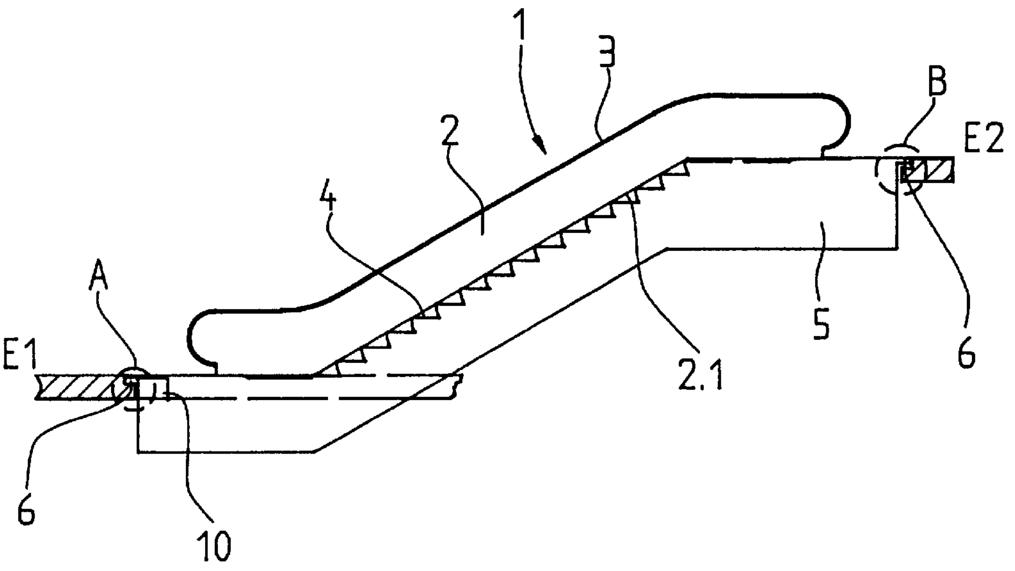
FIG. 1 shows a side view of an escalator incorporating the invention.
Figure 2:
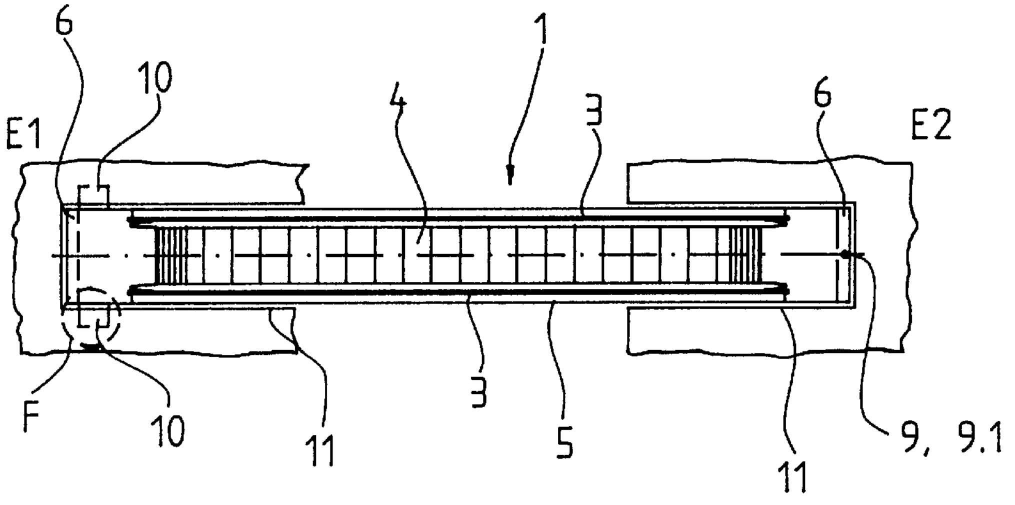
FIG. 2 shows a plan view of the escalator according to FIG. 1.

In accordance with the foregoing and other additional objects and purposes, an escalator or moving walkway constructed in accordance with the present invention is of generally conventional construction, having a belt-like means for transporting persons or objects between stories. Balustrades extend upwardly along the sides of the belt-like member and support a handrail. The balustrades are each supported by a balustrade foot supported by a carrier.

A first end of the carrier is provided with a bed support which is in turn supported upon a bed formed as part of the building construction by a resilient mounting element which provides damping for vibration and the like passing between the escalator and building construction. A second end of the carrier is similarly provided with a bed support which is supported upon a fulcrum firmly mounted to the bed. The fulcrum may be in the form of a bolt upon which the bed support is detented. Damping means may be incorporated into the fulcrum construction.

Further lateral damping elements may be provided at ends of the escalator. These elements may be in the form of dampers extending outwardly from the escalator into recesses in the building construction.

DETAILED DESCRIPTION OF THE INVENTION

An escalator or a moving walkway, which connects a first story E1 with a second story E2, with a step or plate belt means 4 consisting of steps or a travelling path consisting of plates, is denoted by 1 in the Figures. A handrail 3 is located on balustrade 2, which is held at its lower end by means of a balustrade foot 2.1. The balustrade foot 2.1 is in turn supported by a carrier 5 of the escalator 1 or moving walkway.

In the further course of description the term "escalator" will be used instead of the reference "escalator or moving walkway", but it is to be recognized that the embodiments disclosed also apply analogously to a moving walkway.

Figure 3:
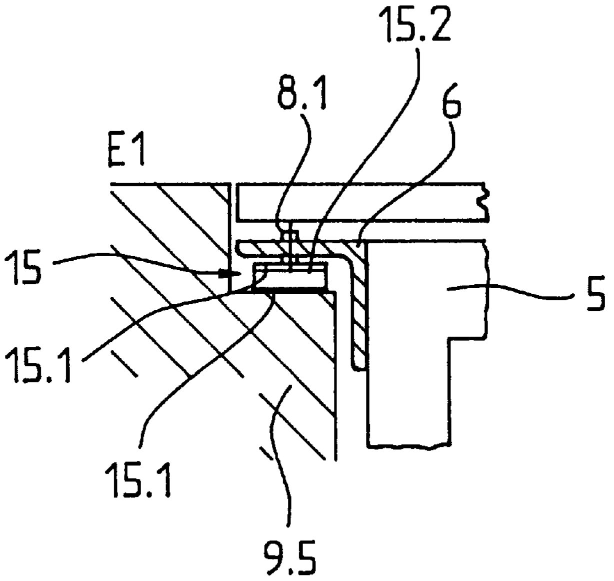
FIG. 3 shows a detail elevation view of a mount at the escalator lower end.
Figure 4:
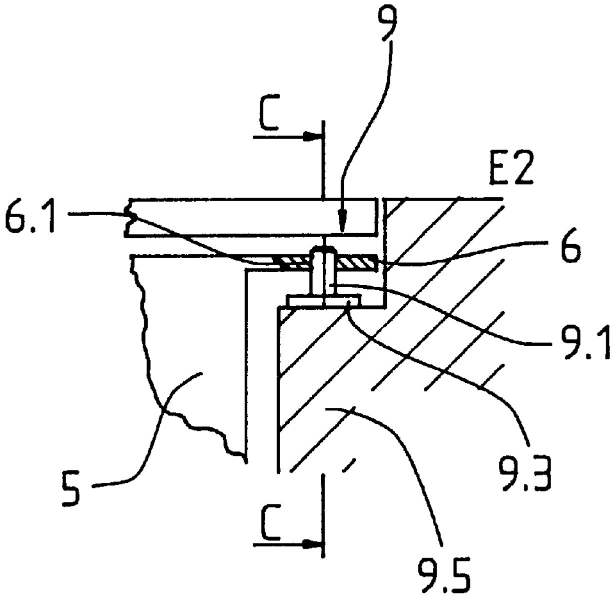
FIG. 4 shows a detail elevation view of a securing element at the escalator upper end.
Figure 5:
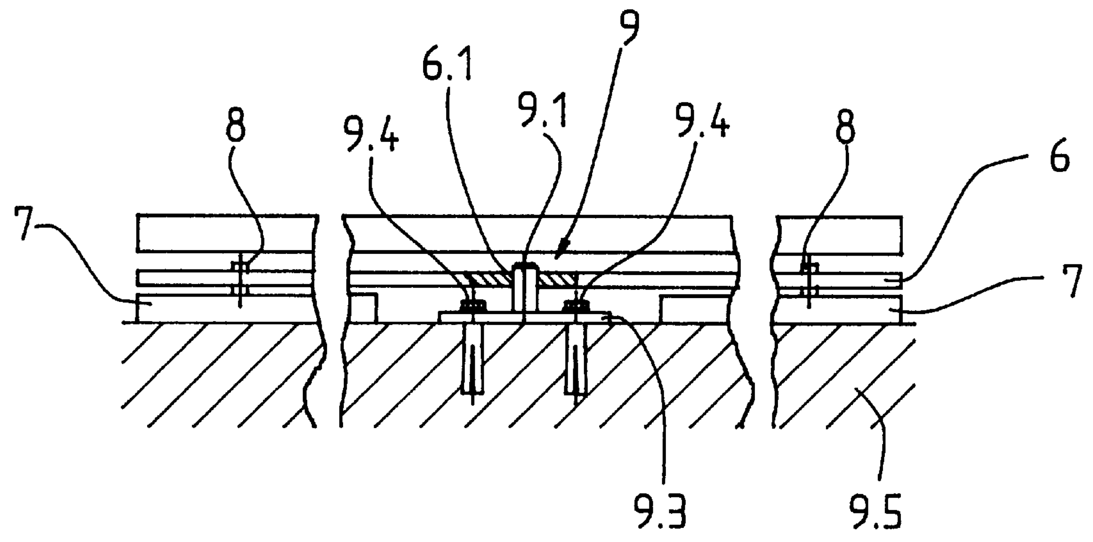
FIG. 5 shows a section through the securing element along the line C—C of FIG. 4.
Figure 6:
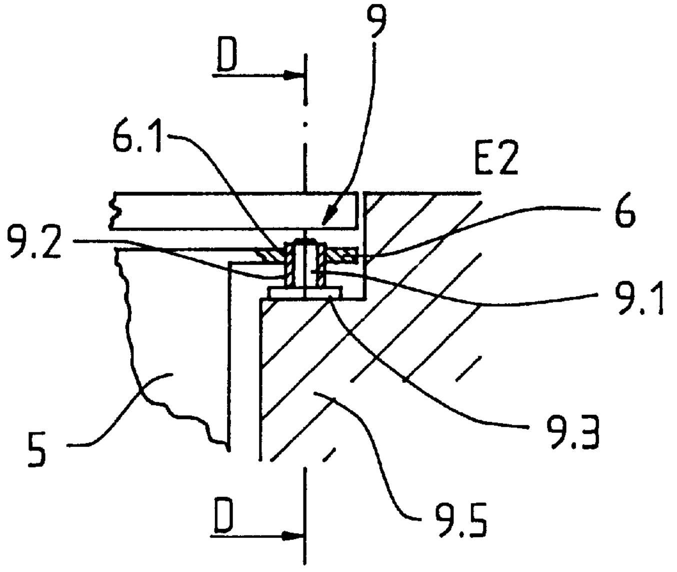
FIG. 6 shows a variant embodiment of the securing element of FIG. 4.
Figure 7:
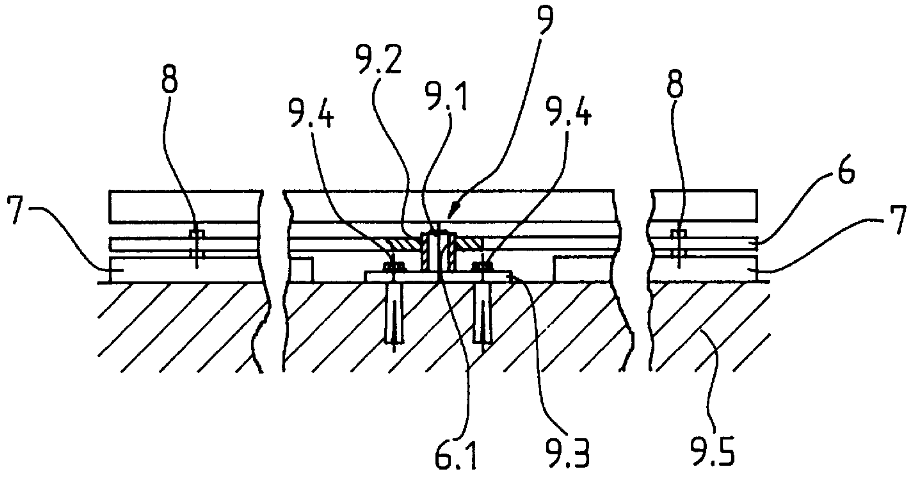
FIG. 7 shows a section through the securing element along the line D—D of FIG. 6.
Figure 8:
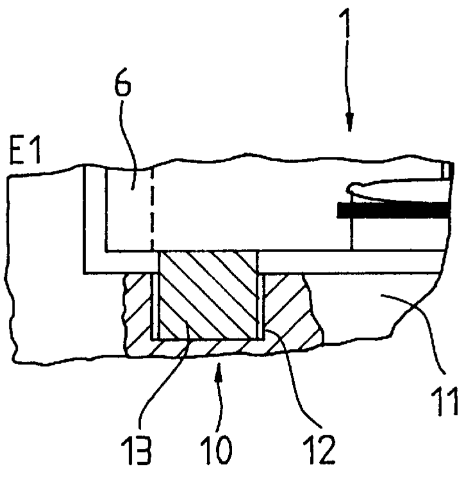
FIG. 8 shows a top plan view in partial section of an end mount damping device for the lower mount, detailing the portion F as denoted in FIG. 2.
Figure 9:
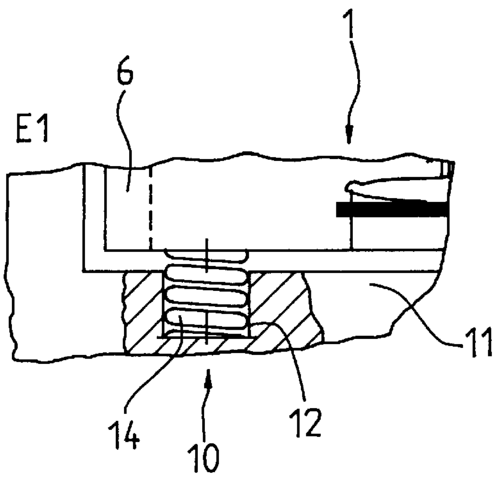
FIG. 9 shows an elevation view of a variant embodiment of the end mount damping device of FIG. 8.

The detail A of the mount at the lower end of the escalator denoted in FIG. 1 is illustrated in FIG. 3. The detail B of the mount at the upper end of the escalator is illustrated in FIGS. 4, 5 and 6. The detail F of an end mount damping device at the lower end of the escalator is illustrated in FIGS. 8 and 9.

FIG. 3 shows details of a bed element arranged at the lower end of the escalator. A bed support 6 of the escalator carrier 5 rests on a bed 9.5, for example formed of concrete, at the building side. A resilient mounting element 15 with a damping element 15.2 mounted between two metal support elements 15.1 is capable of limited lateral movements; one metal support element 15.1 is connected to the bed support 6, such as by the bolt 8.1, and the other metal support element 15 may be similarly connected to the bed 9.5 at the building side.

FIGS. 4 and 5 show details of a securing element 9 at the upper end of the escalator. The bed support 6 of the carrier 5 is provided with a bore 6.1 arranged in the center axis of the escalator. The central axis may be a vertical axis. Bolt 9.1 is firmly connected to the bed 9.5 at the building side by means of a fastening plate 9.3 from which the bolt extends upwardly. Screws 9.4 (seen in FIG. 5) secure the fastening plates to the bed 9.5. Bolt 9.1 serves as a fulcrum for the upper end of escalator 1, as the bore 6.1 of the escalator bed support is detented and supported on the upper bolt portion. For damping purposes, the bolt 9.1 can, as shown in FIG. 6, be provided with a damping element 9.2, for example a sleeve of elastic material. Bearing elements 7, such as sheet steel, are provided along the bed 9.5. Adjusting screws 8 are mounted upon the bed support 6 and assist in positioning the bed support 6 and thus the escalator in position upon the bed. The contact between the adjusting screw 8 and the bearing elements allow the bed support 6 to move as required with respect to the bed 9.5 as damping occurs.

Oscillations and lateral displacements of the story E1 relative to the story E2 may arise in the event of earthquakes or other disturbances. The lower end of the escalator bed, which is shown in FIG. 3, can execute limited lateral movements. In order to damp these movements and to return the escalator to its original position, an end mount damping device 10 shown in FIGS. 8 and 9 is provided. Lateral recesses 12 for receiving damping elements 13, 14 mounted to the bed support 6 are provided in the recess, at the building side or in ceiling passage 11. These damping elements can be, for example, packets of elastic material 13 or damping springs 14.

The illustrated mounts of the lower end of the escalator can also be arranged at the upper end of the escalator and the illustrated securing element of the upper end of the escalator can also be arranged at the lower end of the escalator.

I claim:

1. An escalator or moving walkway comprising a carrier (5), belt means for the transport of persons and objects, and a balustrade (2) with a handrail (3), wherein mounts are provided for mounting the carrier (5) to a building side at ends of the escalator, characterized in that a securing element (9) serving as a fulcrum between the building side and the carrier is provided at one end of the escalator and mounts (10, 15) affixed to the building side for accepting lateral movements and centering the escalator (1) are provided at a second end of the escalator.

2. An escalator or moving walkway according to claim 1, characterized in that the securing element (9) comprises a bolt (9.1) which is mounted to a bed (9.5) at the building side and which penetrates a bore (6.1) in a bed support (6), which bore is arranged along a center axis of the escalator (1).

3. An escalator or moving walkway according to claim 1, characterized in that the bolt (9.1) is provided with a damping element (9.2).

4. An escalator or moving walkway according to claim 1, characterized in that the mounts at the second end comprise a resilient mounting element (15) between a bed support (6) and a bed (9.5) of the building side.

5. An escalator or moving walkway according to claim 1, characterized in that mounts at the second end comprise end mount damping devices (10), which are arranged laterally of the escalator (1), and comprise damping elements (13, 14) which are received by recesses (12) at the building side.

* * * * *